United States Patent Office 3,613,364
Patented Oct. 19, 1971

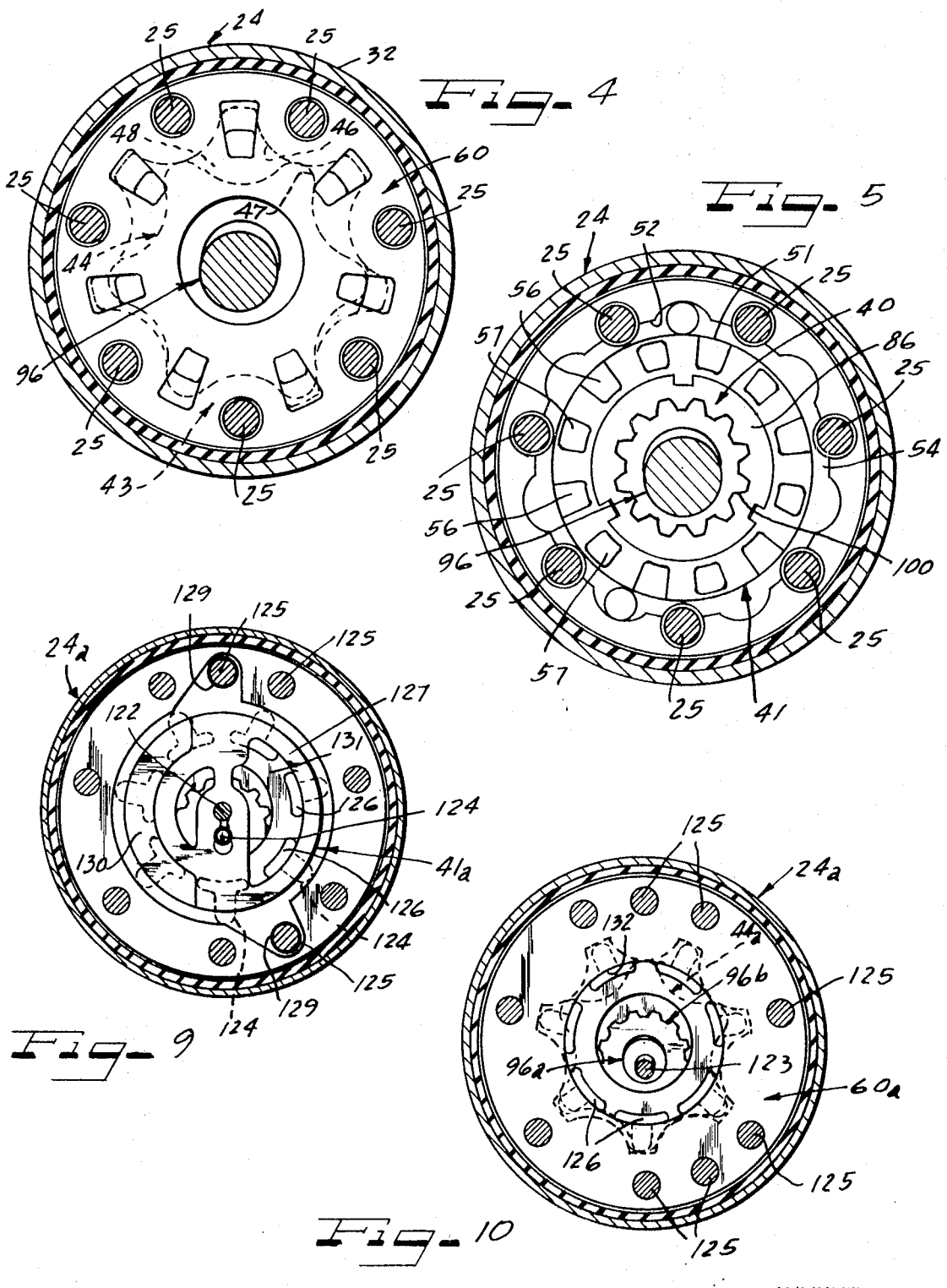

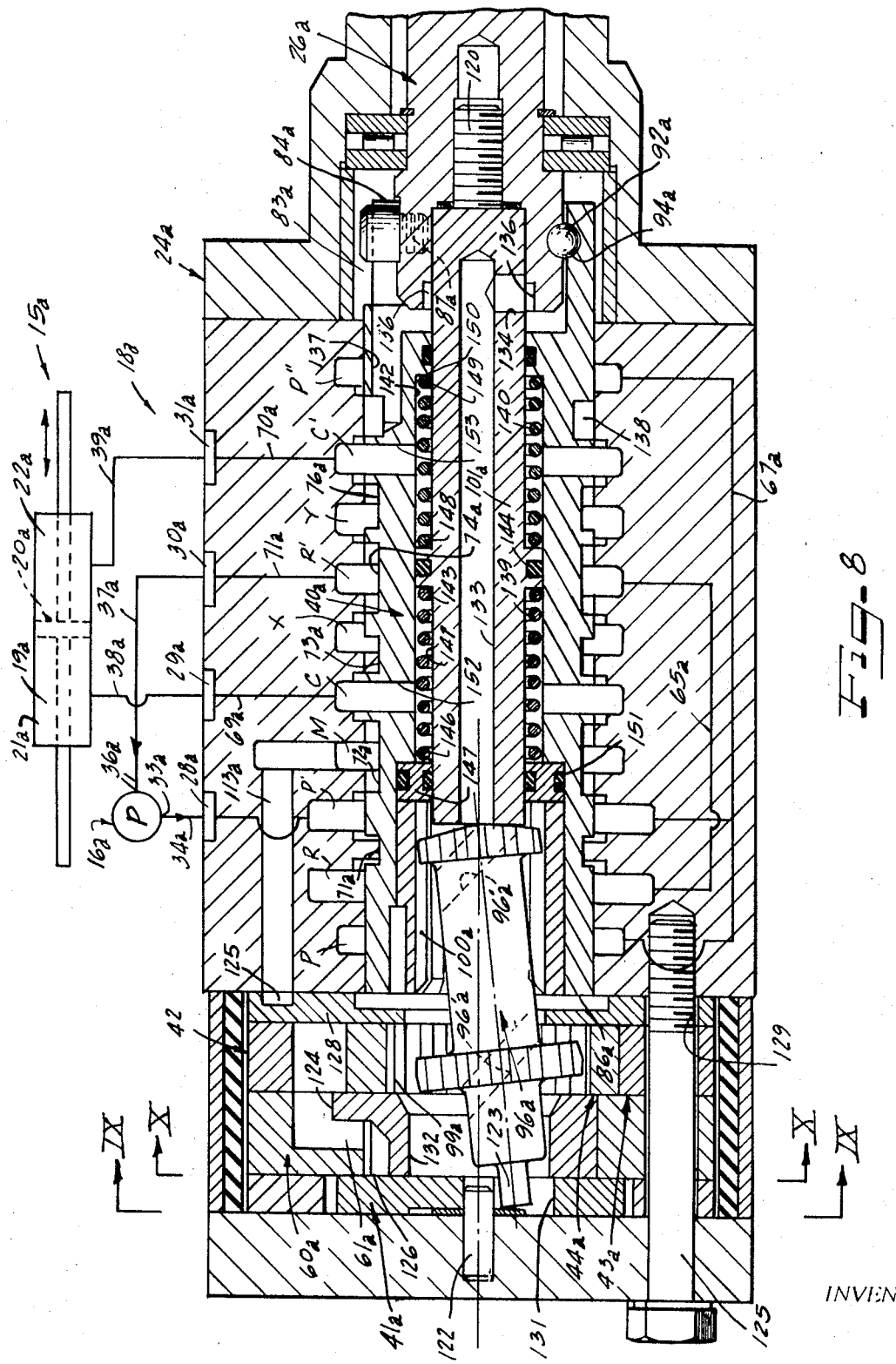

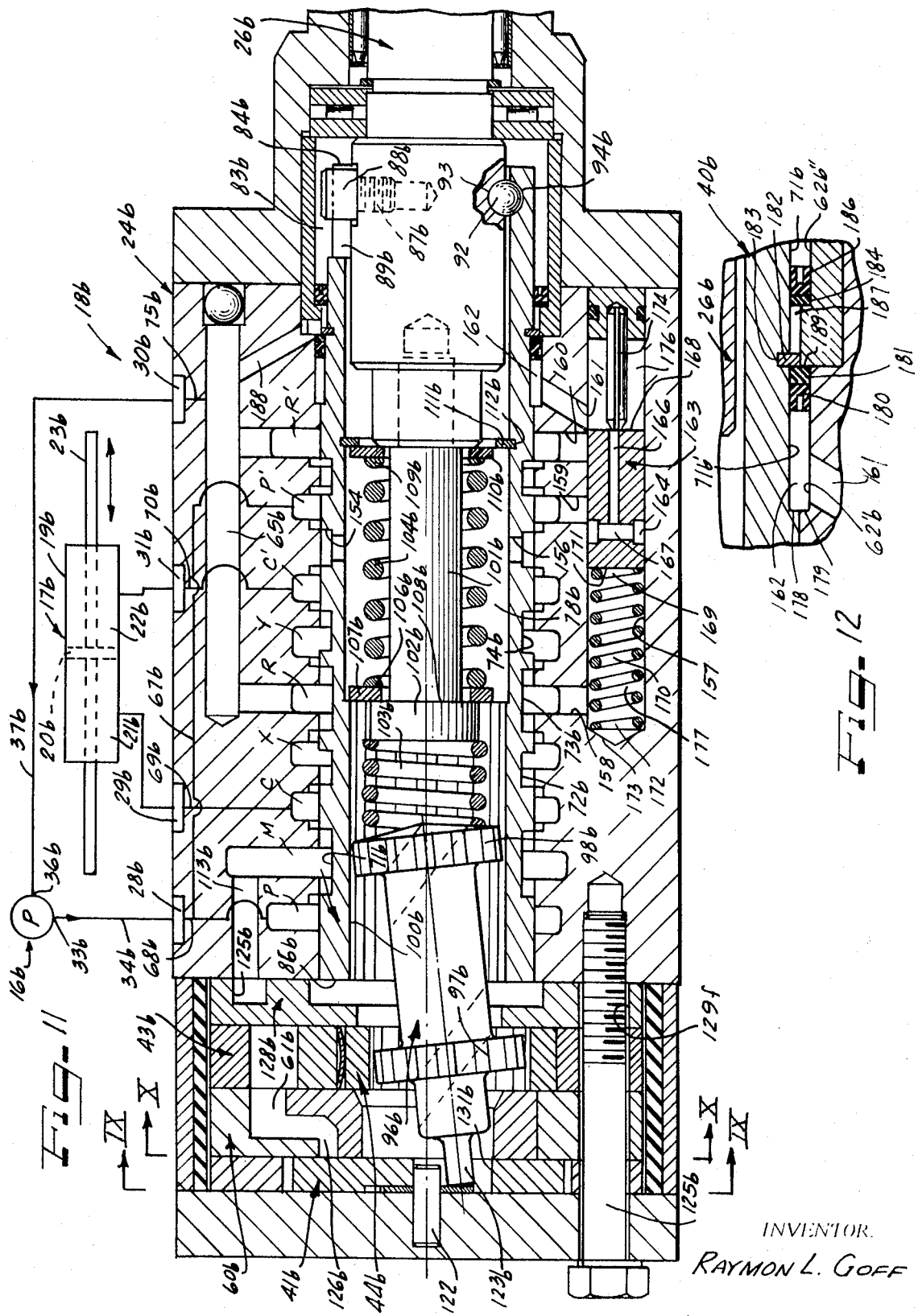

3,613,364
HYDROSTATIC STEERING SYSTEM WITH HYDRAULIC REACTION AND REACTION LIMITING
Raymon L. Goff, Lafayette, Ind., assignor to TRW Inc., Cleveland, Ohio
Filed Mar. 6, 1970, Ser. No. 17,058
Int. Cl. F15b 15/18
U.S. Cl. 60—52 S                    17 Claims

ABSTRACT OF THE DISCLOSURE

A vehicular hydrostatic power steering system including a main power fluid pump, a double-acting hydraulic cylinder and a one-piece hydraulic controller for controlling the flow of fluid to and from the hydraulic cylinder. The controller includes a valve movable alternatively in opposite directions from a neutral position, at which the fluid pressure at the opposite ends of the hydraulic cylinder is balanced, to a pair of operating positions, at which the fluid pressure at the opposite ends of the hydraulic cylinder is unbalanced to move the piston within the cylinder and the dirigible wheels of the vehicle attached thereto. The valve is biased to its neutral position by two forces, the first of which is mechanically produced and substantially constant and the second of which is hydraulically produced and varies in magnitude with variations in the magnitude of the fluid pressure differential between the opposite ends of the hydraulic cylinder. The valve is moved from its neutral position to its operating position against the mechanical and hydraulic biasing forces by virtue of an operating shaft which, conventionally, has a steering wheel mounted thereon. The hydraulic reaction or biasing force applied to the valve, and thus to the steering wheel, provides an improved "feel of the road" for the operator of the vehicle.

BACKGROUND OF THE INVENTION

This invention relates generally to the field of hydraulic servomotor controllers and more particularly to "one-piece" controllers used in hydrostatic servomotor systems such as vehicular power steering systems.

One-piece hydrostatic servomotor controllers commonly include a housing in which are formed a high pressure port (for connection to the high pressure or discharge side of a main power fluid pump), a low pressure port (for connection to the return side of the main pump) and a pair of servomotor ports (for connection respectively to the opposite sides or ends of a double-acting servomotor such as a hydraulic cylinder-piston assembly).

Disposed within the housing is positive displacement fluid meterpump means. Such means may take the form, for example, of an internally toothed gear member and an externally toothed gear member disposed within the internally toothed member and in meshing engagement therewith to provide relative rotational and orbital movement between the two gear members upon operation thereof.

An operating shaft, generally adapted to mount a steering wheel thereon, is rotatably mounted on the housing. Formed within the housing is a valve chamber in communication with the fluid meter-pump means and the above mentioned ports. Carried within the valve chamber is a valve operatively connected to the meter-pump means and to the operating shaft.

The valve is mechanically biased to a neutral position at which the fluid pressure at the two servomotor ports is balanced. Rotation of the operating shaft in either direction of rotation causes the valve to move from its neutral position to one of two operating positions which are disposed respectively on opposite sides of the neutral position. Movement of the valve to an operating position directs pressurized fluid from the main pump through the valve and through the meter-pump means to one end of the double-acting hydraulic cylinder to which the steered wheels are connected, to turn the steered wheels in a direction corresponding to the direction of rotation of the operating shaft. In the event of failure of the main power pump, rotation of the operating shaft drives the meter-pump means through the valve to pressurize one of the two ends of the hydraulic cylinder, the end being pressurized again depending upon the direction of rotation of the operating shaft.

Under power conditions, that is, when the main power fluid pump is operative, the torque to which the operating shaft of prior controllers is subjected when it is turned generally depends almost entirely upon the force being applied to the valve by the mechanical biasing member to bias the valve to its neutral position. Generally, a spring is used as the mechanical biasing member. Thus the torque necessary to turn the operating shaft bears little relation to the magnitude of the force which resists the turning of the steered wheels. In such circumstances the operator of the vehicle has little "feel of the road" as far as the steering operation is concerned. In view of the foregoing there is need for improving the driving "feel" of hydrostatic power steering systems utilizing one-piece servomotor controllers. By hydrostatic steering systems is meant those systems which have only a hydraulic connection between the steering column or operating shaft and the steered wheels, in contrast with power steering systems which have a mechanical connection between the operating shaft and the steering linkage of the vehicle.

Accordingly an object of the present invention is to improve the "feel of the road" in one-piece hydrostatic power steering systems. This improvement is desirable when driving not only on high quality roadways but also on poor quality surfaces and in "off the road" conditions. Unless the magnitude of turning effort is somehow transmitted back to the operator through the steering wheel, his steering capabilities are diminished to the extent that the steering operation seems artificial and produces an unrealistic steering sensation.

Another object of the invention is to hydraulically bias the valve toward its neutral position with a force that is proportional to the turning force applied to the steered wheels. Consequently, as the fluid pressure in the high pressure end of the hydraulic cylinder increases as a consequence of the existence of an impediment to turning of the steered wheels, a reaction force which is proportional in magnitude is applied to the valve, tending to urge the valve back to its neutral position. This reaction force is sensed by the operator as a counter-rotational force applied to the steering column.

Another object, in addition to the application of a hydraulic reaction force on the valve, is to limit the amount of such force. For example, if the steered wheels are subjected to an unusually high impact force, it is desirable to have the operator sense the impact force without necessarily being subjected to the full effect of such force. Thus while it is desirable to have the operator aware of an impediment to turning or an impact force being imposed on the steered wheels, it is not always desirable, depending upon the magnitude of the force, to have the full effect thereof transmitted to the operating shaft.

Another object is to provide means for subjecting the valve, in a one-piece hydrostatic servomotor controller, with a hydraulic reaction force without substantially complicating the design of the controller. Substantial design complications not only increase the manufacturing cost of a controller but also may reduce the efficiency of the controller.

SUMMARY OF THE INVENTION

With a view to achieving the aforementioned objects, the present invention may be summarized as comprising a one-piece servomotor controller of the type generally described above having fluid pressure motive surfaces formed on the valve and communicating respectively with the servomotor ports for hydraulically biasing the valve toward the neutral position thereof with a force corresponding in magnitude to the magnitude of the difference in fluid pressure between the servomotor ports or, in other words, across the opposite ends of the hydraulic cylinder.

In the various embodiments of the one-piece hydrostatic servomotor controller illustrated herein the valve which controls the direction of fluid through the controller is cylindrically shaped and is shiftable axially between its neutral position and its two operating positions. The valve is connected to a rotatable one of two gear members for joint rotation and is connected to the operating shaft for relative axial movement and for limited relative rotation. Thus, when the operating shaft is turned in one direction the valve is shifted axially to one of its operating positions. When the operating shaft is turned in an opposite direction the valve shifts to the other operating position. Under manual steering conditions, that is, when the main power fluid pump is inoperative, rotation of the operating shaft not only shifts the valve axially but also drives the gear members through the valve to manually pressurize the opposite ends of the hydraulic cyinder to control the turning of the steered wheels.

In one embodiment of the invention the motive surfaces are formed at the axial ends of the valve, referred to hereinafter as a directional control valve since it controls the direction of the flow of fluid through the controller, whereas in other embodiments the motive surfaces are formed between the ends of the valve. In all embodiments a mechanical member is utilized to provide a primary biasing force on the valve to urge it to its neutral position, the hydraulic reaction force serving as a secondary biasing force on the valve to improve the "feel of the road" characteristics of the steering system.

Many other features, advantages and additional objects of the present invention will become manifest to those versed in the art upon making reference to the detailed description which follows and the accompanying sheets of drawings, in which preferred and structural embodiments incorporating the principles of the present invention are shown by way of illustrative example only.

BRIEF DESCRIPTION OF THE DRAWING

FIGS. 4 and 5 are sectional views and are taken respectively substantially along the lines IV—IV and V—V of FIG. 1.

FIGS. 6 and 7 are also sectional views taken respectively along lines VI—VI and VII—VII of FIG. 1.

FIG. 8 is similar to FIG. 1 but discloses another embodiment of a one-piece hydrostatic servocontroller constructed in accordance with the principles of the present invention.

FIGS. 9 and 10 are sectional views taken substantially along lines IX—IX and X—X of FIGS. 8 and 11.

FIGS. 11 and 12 discloses another embodiment of a controller constructed in accordance with the principles of the present invention.

DESCRIPTION OF THE PREFERRED EMBODIMENTS

While the present invention has utility in controlling the operation of any hydraulic servomotor, it finds particular utility in hydrostatic power steering systems for vehicles and is described herein in relation to the function which it performs in such a power steering system.

Figure 1:
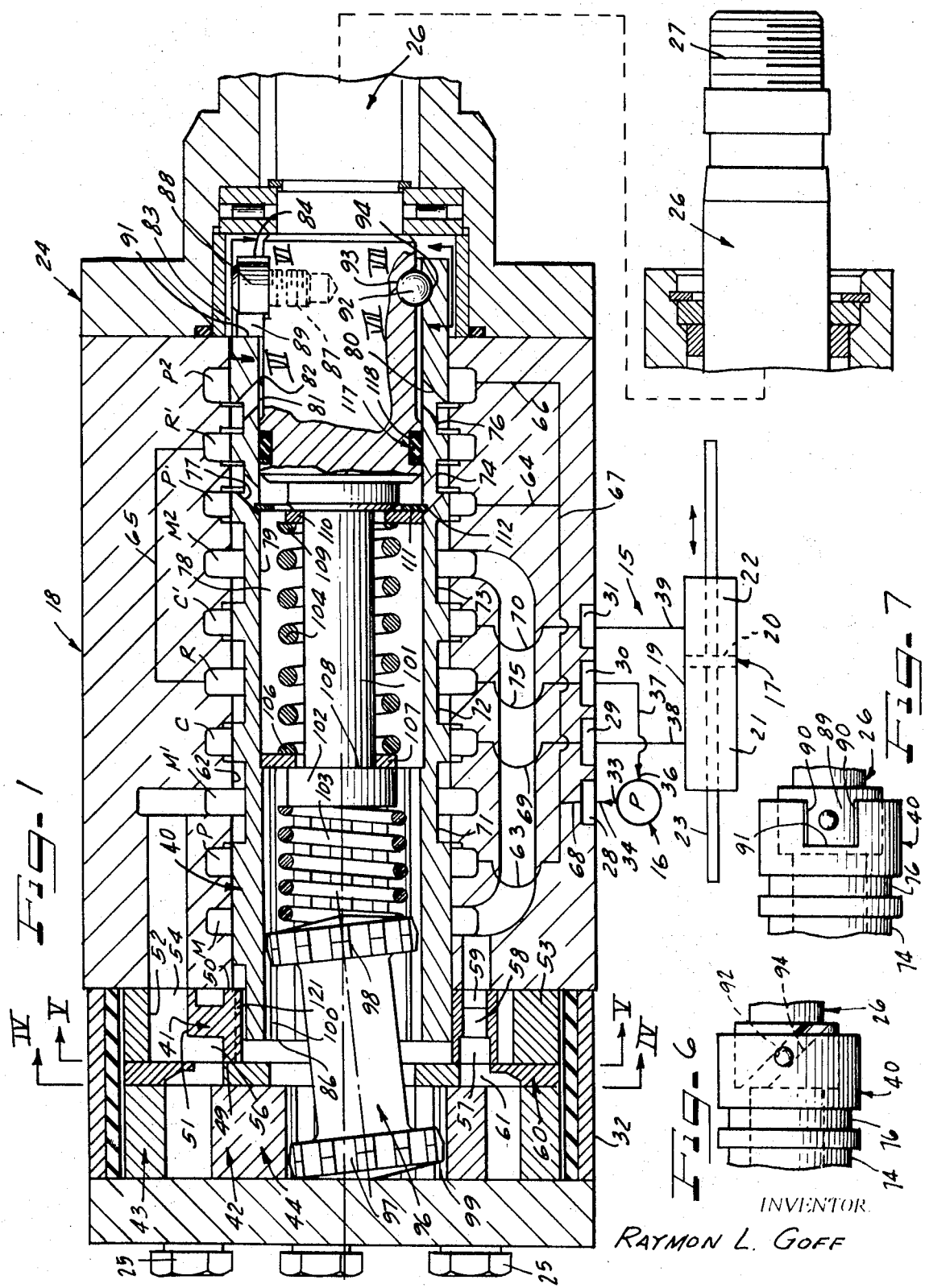
FIG. 1 is a partially schematic view of a power steering system incorporating a one-piece hydrostatic servomotor controller constructed in accordance with the principles of the present invention, the controller being shown in longitudinal section.

Referring to the drawings, the hydraulic circuitry of a hydrostatic vehicular power steering system is indicated generally in FIG. 1 at reference numeral 15. The illustrated components of the system 15 include a main power fluid pump 16, which may be connected directly in driven relation to the main engine of the vehicle, a hydraulic servomotor 17 which, in the embodiment illustrated, comprises a double-acting piston-cylinder assembly, and a fluid controller 18, which controller is constructed in accordance with the principles of the present invention.

The servomotor 17 comprises a hydraulic cylinder 19 in which is carried a conventional piston 20 which divides the cylinder 19 into opposite ends 21 and 22. A piston rod 23 is connected to the piston 20 and extends from opposite ends thereof through the end walls of the cylinder 19. The ends of the piston rod 23 are adapted for connection to the steering linkage of the vehicle on which the system 15 may be mounted and as the piston rod 23 reciprocates back and forth, the dirigible wheels of the vehicle are turned in opposite directions as will be understood by those skilled in the art.

The function of the controller 18 is to control the direction of the flow of pressurized fluid between the pump 16 and the opposite ends 21 and 22 of the cylinder 19 in accordance with the direction of operation thereof by the operator of the vehicle. To that end the controller 18 comprises a housing 24 on which is mounted a rotatable operating shaft or steering column 26. An outboard end 27 of the shaft 26 is adapted to receive a conventional steering wheel for facilitating rotation of the shaft 26 by the operator of the vehicle.

Four fluid ports indicated respectively at reference numerals 28, 29, 30 and 31 are formed in an outer wall 32 of the controller housing 24. Port 28 is connected to a high pressure or discharrge side 33 of the pump 16 through a conduit 34 and thus may be conveniently referred to as a high pressure port. Port 30 is connected to a low pressure or suction side 36 of the pump 16 via a conduit 37 and therefore is referred to as a return port. Ports 29 and 30 are connected respectively to the opposite ends 21 and 22 of the cylinder 19 by means of conduits 38 and 39 and therefore are conveniently referred to herein as servomotor ports.

In addition to the operating shaft 26, the controller 18 comprises additional components inculding a cylindrically shaped directional control sleeve valve 40, a disc-shaped fluid distributor or commutator valve 41 and meter-pump fluid displacement means indicated generally at reference numeral 42.

In the embodiment illustrated the fluid displacement means 42 comprises a pair of gear members 43 and 44. Gear member 43 is internally toothed and mounted stationarily within the housing 24. The gear member 44 is externally toothed and is disposed within the gear member 43.

The internal teeth of the gear member 43 are indicated at reference numerals 46 in the reflected view thereof shown in FIG. 4 and the external teeth of gear member 44 are indicated at reference numerals 47. The number of teeth 46 of the gear member 43 exceeds the number of teeth 47 of gear member 44 by one, and as a result of this arrangement of the teeth, the gear member 44, when subjected to a rotational force, not only rotates but also orbits relative to the gear member 43. The ratio of the orbital speed of the gear member 44 to the rotational speed thereof equals $N/1$, wherein N equals the number of teeth of the gear member 44. For purposes of this description the stationary gear member 43 will be referred to as a stator, whereas the rotationally orbitally movable gear member 44 will be referred to as a rotor. Other examples of this gear arrangement are shown in issued patents including White, Jr. et al., U.S. Pat. No. 3,288,034.

As the rotor 44 rotates and orbits relative to the stator 43 a series of expanding and contracting fluid pockets or chambers 48 are formed between the teeth 46 of the stator 43. Fluid is directed to the expanding pockets and from the contracting pockets by means of the commutator valve 41.

To this end the valve 41 comprises a pair of radial end walls 49 and 50 and an outer peripheral wall 51 which is disposed in radially spaced relation with an inner peripheral wall 52 of an annular ring 53 which surrounds the commutator valve 41.

An annular chamber 54 between the peripheral walls 51 and 52 openly communicates with a series of recesses 56 formed in the radial end wall 49 of the valve 41. The recesses 56 equal six in number, which is the number of teeth 47 formed on the rotor 44.

Also formed in the radial wall 49 between the recesses 56 is a series of ports 57 which communicate with radial wall 50 through a corresponding number of axial passages 58 which in turn communicate with an annular recess 59 formed in the radial wall 50.

Disposed axially between the rotor 44 and the commutator valve 41 is a commutator plate 60 having a series of passages 61 extending axially therethrough. The number of passages 61 corresponds to the number of fluid pockets 48 between the stator teeth 46 and are arranged so as to communicate respective with the fluid pockets 48. The commutator plate 60 remains stationary during operation of the rotor 44 whereas the commutator valve 41 rotates at the speed of rotation of the rotor 44.

The directional control or sleeve valve 40 is carried in a cylindrical chamber formed in the housing 24 by means of a bore wall 62. A series of axially spaced circumferentially continuous grooves are formed in the bore wall 62. These grooves are identified in FIG. 1 at reference characters M, P, M', C, R, C', M², P', R' and P². The grooves P, P' and P² are interconnected by means of internal passages 63, 64, 66 and 67 and are connected to the high pressure port 28 by means of a passage 68. The grooves C and C' are connected respectively to the servomotor ports 29 and 31 by means of internal passages 69 and 70 and groove R is connected to the return port 30 by means of an internal passage 75.

A series of grooves is also formed in the outer wall 65 of the directional control sleeve valve 40. Thus there is shown in FIG. 1 a series of axially spaced circumferentially continuous grooves including grooves 71, 72, 73, 74 and 76. Also shown in bore 77 which extends radially through the wall of the valve 40 and communicates at one end with the groove 74 and opens at an inner end to a chamber 78 formed by an inner wall 79 of the valve 40.

Another passageway 80 extends through the valve 40 and communicates at one end with the groove 76 and opens at an opposite end to an annular chamber 81 formed between an outer wall 82 of the operating shaft 26 and the inner wall 79 of the valve 40. Chamber 81 communicates in turn with another chamber 83 in which a radial end wall 84 of the valve 40 resides. An opposite radial end wall 86 of the valve 40 is in open communication with the hollow chamber 78 of the valve 40.

Referring to FIGS. 1 and 6, a bolt 87 is threaded in a radial direction into the operating shaft 26 and comprises an enlarged head 88 which resides within the chamber 83 and also within an axially extending groove 89 formed in the directional control valve 40. The diameter of the head portion 88 is less than the circumferential distance between a pair of side walls 90 and 91 of the groove 89. Thus, the shaft 86 is capable of limited relative rotation with respect to the valve 40 but upon abutment of the head 88 with either of the side walls 90 or 91 the operating shaft 26 and the valve 40 are rotated jointly.

The valve 40 is also adapted to shift axially with respect to the operating shaft 26. Referring to FIGS. 1 and 6 a spherical ball 92 is carried in a semi-spherical recess 93 formed in the shaft 26. The ball 92 also rides in a helical groove 94 formed in the inner perpiheral wall 79 of the valve 40. Thus, as the shaft 26 is rotated relative to the valve 40 the valve is shifted axially with respect to the shaft 26 and, of course, with respect to the housing 24 of the controller 18.

The directional control valve 40 is connected for joint rotation with the rotor 44 by means of a wobble shaft 96 which is splined at one end 97 for joint rotation with the rotor 44 and at an opposite end 98 for joint rotation with the valve 40. An inner wall 99 of the rotor 44 is also complementarily splined as is the inner wall 79 of the valve 40 as is indicated at reference numeral 100.

As shown in FIG. 1 a shaft extension 101 projects from the operating shaft 26 into the hollow interior 78 of the valve 40. An enlarged head 102 is formed at the distal end of the shaft extension 101 and a coil spring 103 is bottomed at opposite ends on the head 102 as well as on the end 98 of the wobble shaft 96 to maintain the wobble shaft 96 in oposition.

Another coil spring 104 is disposed in surrounding relation to the shaft extension 101 and is bottomed at one end 106 on a washer 107 which in turn is bottomed on an end wall 108 of the shaft extension head 102. An opposite end 109 of the spring 104 is bottomed on another washer 110 which in turn is bottomed on a snap ring 111 which fits into a groove 112 formed in the inner peripheral wall 79 of the directional control valve 40.

The spring 104 provides a mechanical bias for centering the directional control valve 40, that is, for urging the valve 40 to a neutral position.

Figure 2:
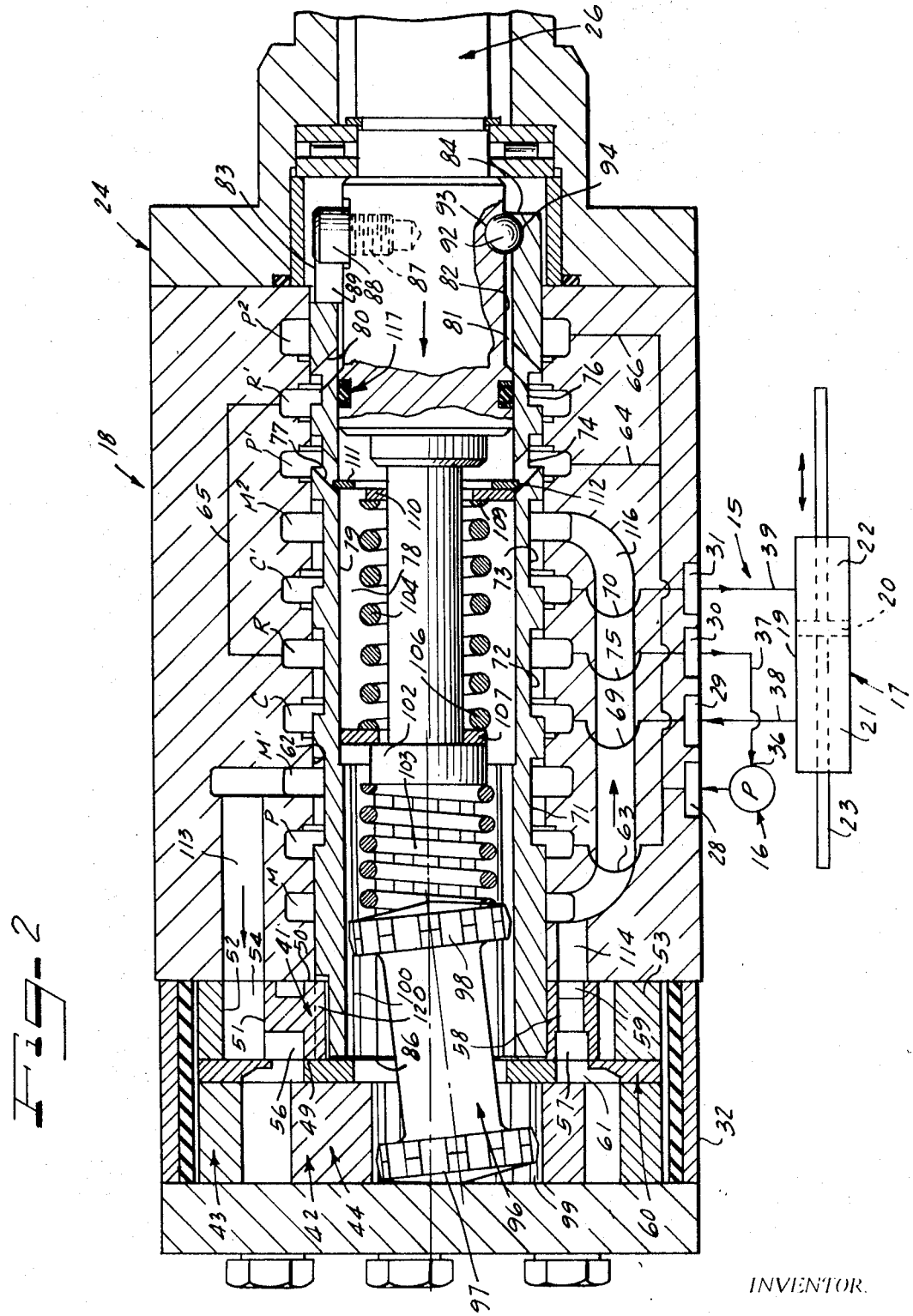
FIG. 2 is similar to FIG. 1 but shows the disposition of the directional control valve after it has been shifted from a neutral position as shown in FIG. 1 to an operating position.
Figure 3:
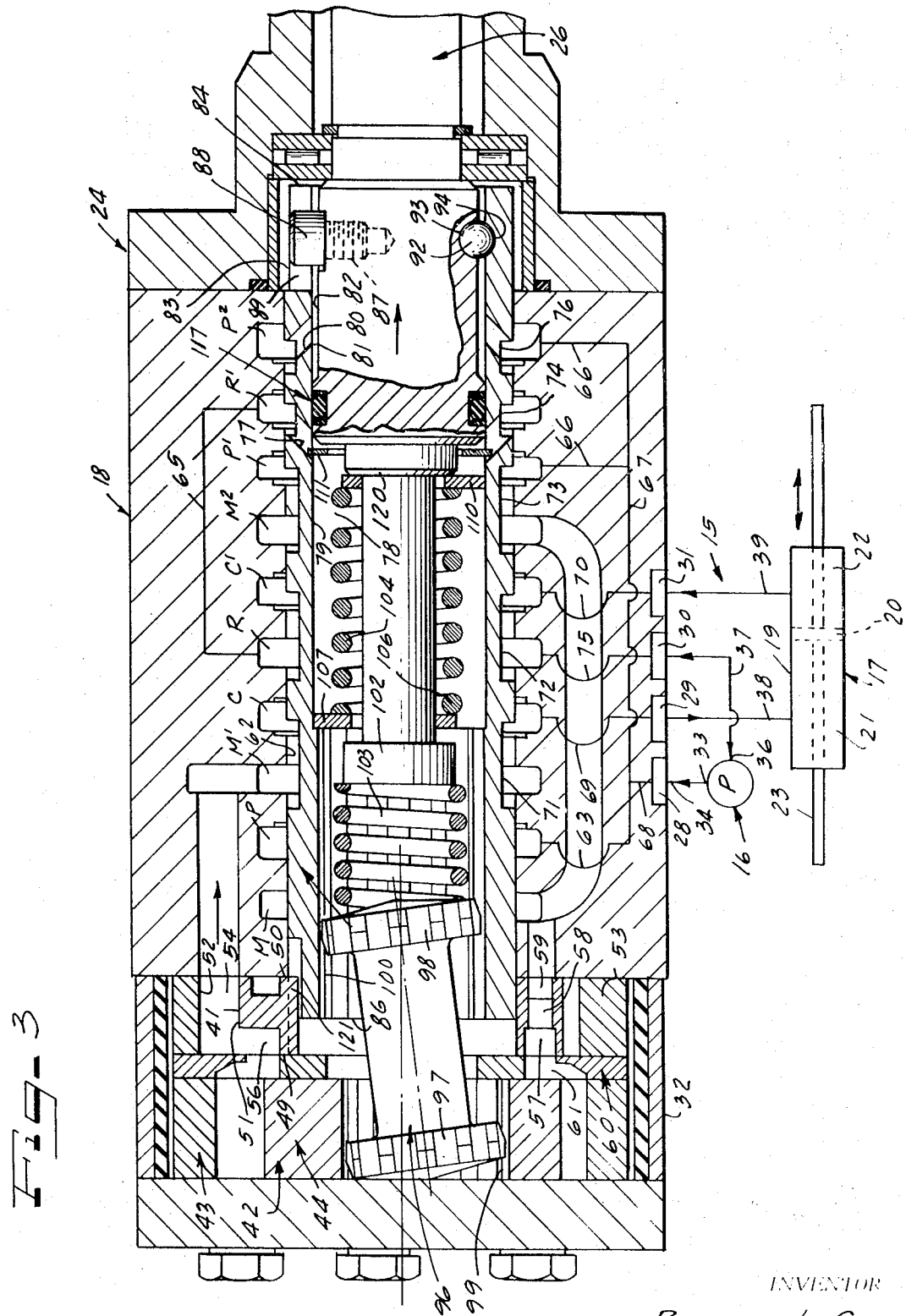
FIG. 3 is similar to FIG. 2 but shows the directional control valve after being shifted in an opposite direction to its second operating position.

The neutral position of the valve 40 is that which obtains in the view thereof shown in FIG. 1. FIG. 2 is similar to FIG. 1 except that the valve 40 has been shifted leftwardly from its neutral position to one of its two operating positions. FIG. 3 is also similar to FIG. 1 but shows the valve 40 shifted rightwardly to its second operating position. With respect to the neutral position axial of the valve 40 the operating positions shown in FIGS. 2 and 3 are on the axial opposite sides thereof.

When the directional control valve 40 is located in its neutral position the flow of fluid through the controller 18 is blocked by virtue of the fact that grooves P, P' and P2 are blocked by the valve 40. This arrangement may be conveniently referred to as a "closed center" arrangement since in the center or neutral position of the valve 40 the controller 18 is "closed" to the main power fluid pump 16. By suitable modification, of course, the valve 40 may be adapted to provide an "open center" arrangement, whereby the flow of fluid from the pump 16 may be circulated through the controller 18 from the discharge to the return side of the pump 16 in the neutral or center position of the valve 40.

Assuming that the main power fluid pump 16 is operative and the operating shaft or steering column 26 is rotated in a clockwise direction as viewed from the righthand side of FIG. 1, the directional control valve 40 will be shifted axially leftwardly to the operating position thereof shown in FIG. 2. In this position of the valve 40 fluid from the discharge or high pressure side of the pump 16 passes from the groove P formed in the bore wall 62 through the adjacent groove 71 formed in the directional control valve 40 and into the groove M'.

From groove M' the high pressure fluid is directed through a passageway 113 formed in the housing 24 and into the chamber 54 surrounding the commutator valve 41.

The recesses 56 formed in the radial wall 49 of the commutator valve 41 are filled with high pressure fluid and by desgin such pressure filled recesses communicate with the passages 61 formed in the commutator plate 60 which are in open communication with the expanding ones of the fluid pockets 48 formed between the stator 43 and the rotor 44.

The rotor 44 is thereby caused to rotate in the same direction as the rotation of the operating shaft 26 and orbits in an opposite direction, the orbital speed of the rotor 44 being six times the rotational speed thereof. Such rotational and orbital movement of the rotor 44 forces the fluid in the contracting fluid pockets 48 to be directed into other of the passages 61 which are in open communication with the contracting fluid pockets. The fluid is thence directed through the ports 57 formed in the commutator valve 41 and through the passages 58 and the annular groove 59 and into a passage 114 formed in the controller housing 24 and thence into the groove M.

From the groove M the fluid is conducted through another internal passage 116 to the groove M², from which it is transferred through the groove 73 formed in the valve 40 to the groove C'. From groove C' the fluid is conducted to the end 22 of the hydraulic cylinder 19, via conduit 70, servo-motor port 31 and conduit 39, causing the piston 20 and piston rod 23 to move leftwardly as indicated in FIG. 2.

The fluid in the opposite end 21 of the hydraulic cylinder 19 flows through conduit 38, servomotor port 29 and conduit 69 to groove C. From groove C the fluid is transferred via groove 72 formed in the valve 40 to the groove R, from which it flows through conduit 75, return port 30 and conduit 37 to the suction or low pressure side 36 of the main power fluid pump 16.

By virtue of the wobble shaft 96 the directional control valve 40 rotates jointly with the rotor 44. So long as the rotation of the steering column or operating shaft 26 continues, the directional control valve 40 will be maintained in its leftward operating position and fluid will continue to flow from the main power fluid pump 16 through the controller 18 and to the end 22 of the hydraulic cylinder 19. The piston rod 23 will, therefore, continue to move and the steered wheels of the vehicle will continue to be turned.

As the directional control valve 40 is moved to the leftward operating position thereof as shown in FIG. 2 the coil spring 104 is compressed by virtue of the fact that the snap ring 111 has moved the washer 110 leftwardly in the direction of washer 107. Thus, the spring 104 subjects the valve 40 to a mechanical bias, tending to urge the valve 40 rightwardly back to the neutral position thereof. Throughout the length of travel of the snap ring 111 the biasing force of the spring 104 remains substantially constant and constitutes substantially the only force resisting rotation of the steering column 26. Furthermore, this resistance to turning does not vary in accordance with the magnitude of the reaction force acting on the piston rod 23 since the resistance to axial movement of the valve 40 afforded by the spring 104 remains constant regardless of the magnitude of the reaction force applied to the piston rod 23.

In accordance with the principles of the present invention the directional control valve 40 is also biased to a neutral or center position by a hydraulic force, the magnitude of which varies with the magnitude of the reaction force to which the steered wheels, through the piston rod 23, are subjected. Thus, the torque which must be applied in rotating the steering column or operating shaft 26 varies in accordance with the reaction force to which the steered wheels are subjected, giving the operator of a vehicle a general "feel of the road."

To that end a fluid seal in the form of an O-ring 117 is mounted in a complementarily shaped circumferentially continuous groove 118 formed in the peripheral wall 82 of the operating shaft 26. The O-ring 117 hydraulically separates the chambers 81 and 83 located on one side thereof with the hollow chamber 78 formed within the directional control valve 40.

When the valve 40 is moved to its leftward operating position as viewed in FIG. 2, high pressure fluid is communicated to the interior chamber 78 of the valve 40 through the high pressure groove P, the internal passages 63 and 64, the high pressure groove P', the groove 74 and the passage 77. Thus, the radial end wall 86 of the valve 40 is subjected to high pressure fluid and serves as a motive surface tending to hydraulically bias the directional control valve 40 rightwardly or toward the neutral position thereof.

On the other hand, the chambers 81 and 83 are in communication, through the groove 76 and the passage 80 formed in the valve 40, with the groove R'. The groove R', however, is subjected to low pressure fluid by communication with groove R via an internal passage 119.

As a consequence the radial end wall 84 of the directional control valve 40 is subjected to low pressure fluid and serves as a motive surface tending to bias the valve 40 leftwardly.

Since the pressure in chamber 78, to which the valve end wall 86 is subjected, is greater than the fluid pressure in chamber 83, to which the end wall 84 is subjected, the valve is hydraulically unbalanced in a rightward direction or toward the neutral position thereof by a force which is proportional to the difference in fluid pressure between chambers 78 and 83.

The fluid pressures in chambers 78 and 83 are, however, substantially equal to the fluid pressures which obtain in the opposite ends 21 and 22 of the hydraulic cylinder 19. Thus, as the pressures on the opposite ends of the cylinder 19 vary in accordance with variations in reaction forces to which the steered wheels are subjected the hydraulic force tending to move the valve 40 also varies. This hydraulic force, which varies the torque required to rotate the operating shaft 26, improves the operator's "feel of the road" and provides a more realistic steering sensation.

When the operating shaft 26 is rotated in a counterclockwise direction as viewed from the righthand side of FIG. 1, the directional control valve 40, by virtue of the ball 92 and helical groove 94, is shifted axially rightwardly to the operating position thereof shown in FIG. 3. In this position of valve 40 the interior chamber 78 thereof, and thus the radial end wall 86, is subjected to low pressure fluid, whereas the chamber 83, and thus the radial end wall 84, is subjected to high pressure fluid.

Consequently, when the valve 40 is shifted rightwardly there is a hydraulic imbalance tending to urge the valve 40 leftwardly back to the neutral position thereof. Once again this hydraulic imbalance varies in accordance with variations in reaction forces to which the steered wheels are subjected.

This reaction force is, of course, supplemented by the mechanical bias afforded the valve 40 by virtue of the spring 104. FIG. 3 the washer 110 is bottomed on a radial wall 120 of the operating shaft 26 and therefore cannot move rightwardly even though the snap ring 111 mounted on the valve 40 is moved rightwardly.

On the other hand, washer 107 is lifted off of and away from the head 102 of the shaft extension 101 by virtue of the splines 100 formed on the inner peripheral wall 79 of the directional control valve 40. Thus, the spring 104 tends to mechanically bias the valve 40 leftwardly to the neutral position thereof, but as noted above, this mechanical bias remains substantially constant and is not influenced by the magnitude of the reaction force imposed upon the steered wheels of the vehicle as is the hydraulic reaction force acting on the directional control valve 40, and through that valve, to the operating shaft 26.

Under power conditions, that is, when the main power fluid pump 16 is operating, the stator 43 and the rotor 44 of the fluid displacement means 42 serve to provide a metering effect of the fluid from the pump 16 to the hydraulic cylinder 19. In addition, the rotor 44, by rotating the directional control valve 40, provides a "follow-up" movement thereto relative to the operating shaft 26, as will be understood by those skilled in the art.

Under manual steering conditions, that is, when the pump 16 is inoperative due to malfunction or the like, rotation of the operating shaft 26, in addition to causing axial shifting of the valve 40, also rotates the valve 40 upon abutment of the bolt head 88 with either of the side walls 90 or 91 of the valve groove 89. Through the operating shaft 26 and the valve 40 the driver of the vehicle actually operates the gear members 43 and 44 to direct pressurized fluid to one of the two opposite ends 21 and 22 of the hydraulic cylinder 19. The direction of rotation of the operating shaft 26 determines which of the two ends 21 and 22 receives the high pressure fluid. Even under manual steering conditions, however, the hydraulic reaction force to which the valve 40 and the operating shaft 26 are subjected, varies in accordance with variations in the reaction force to which the steered wheels are subjected.

Thus, the "feel of the road" advantages inherent in the present invention obtain not only under power steering conditions, but also under manual steering conditions.

The embodiment of the invention illustrated in FIGS. 8–10 is similar in many respects to that shown in FIGS. 1–7 and for that reason reference numerals used in FIGS. 1–7 are also used in FIGS. 8–10 to denote similar parts, with the suffix $a$ added thereto.

The controller 18a comprises a housing 24a, an opening shaft 26a, a shaft extention 101a connected in fixed assembly by means of threaded shaft part 120 for joint rotation with the operating shaft 26a, an axially shiftable and rotatable fluid direction and control valve 40a, a commutator valve 41a, a stationary commutator plate 60a and fluid displacement means 42a including a stator 43a and a rotor 44a. A wobble shaft 96a interconnects the rotor 44a with the directional controller valve 40a for joint rotation. A threaded stud 87a interconnects the operating shaft 26a and the directional control valve 40a for limited relative rotation and a sperical ball 92a ridng in a helical recess 94a interconnects the shaft 26a and the valve 40a for relative axial movement.

In the embodiment shown in FIGS. 1–7, the commutator valve 41 is rotated at a speed which is equal to the rotation of speed of the rotor 44 by means of a splined connection 121 between the commutator valve and the directional control valve 40. The valve 40 is driven at the rotational speed of the rotor 44 by means of the wobble shaft 96. In the embodiment shown in FIGS. 8–10, however, the commutator valve 41a is journalled on a stationary pin 122 and is rotated at the orbital speed of the rotor 44a.

To so increase the operating speed of the commutator valve 41a a finger 123 projects from the wobble shaft 96a and is received in a bore 124 formed in the commutator valve 41a. Because of its eccentric relation thereto the finger 123 rotates the commutator valve 41a about the axis of the pin 122 at the orbital speed (as contrasted with the rotational speed) of the wobble shaft 96a, which is equal to the orbital speed of the rotor 44a.

The commutator plate 60a has a series of axial passages 61a formed therein which are equal in number to the number of teeth 46a of the stator 43 (or 7 in the illustrated embodiment) and terminate at one end in a series of ports 124 which open at one end to the fluid pockets 48a and at an opposite end in a series of ports 126 which open to the commutator valve 41a. The ports 126 are arranged in a circular pattern about the axis of rotation of the commutator valve 41a.

The commutator valve 41a is constructed and arranged with a land 127 operating in sliding engagement with the commutator valve 61a to communicate the ports 126, and therefore the fluid pockets 48a, alternately in the timed relation with the rotational and orbital movement of the rotor 44, with high and low pressure fluid, the high pressure fluid, of course, being directed to the expanding fluid pockets and the lower pressure fluid being directed from the contracting fluid pockets. A commutator valve arrangement similar to that illustrated at FIGS. 8–10 is also illustrated and described in said White, Jr. et al. patent.

The fluid directional contral valve 40a is shown in its neutral position in FIG. 8. In this position the valve 40a blocks off communication between the discharge and the suction sides 33a and 36a of the main fluid pump 16a. As noted above, however, with only minor modification, the valve 40a could be adapted to serve as an "open center" valve which would permit the circulation of fluid through the controller 18a between the discharge and suction sides of the pump 16a in the neutral position of the valve 40a.

When the operating shaft 26a is rotated in a clockwise direction as viewed from the right-hand side of FIG. 8, the valve 40a is shifted axially leftwardly. High pressure fluid is then transmitted through conduit 34a to the high pressure port 28a and thence to the groove P. The latter groove, in the left operating position of the valve 40a, communicates with groove M through the groove 71a formed in the valve 40a. From groove M the fluid is directed through passageway 113a to an annular groove 125 formed in a stationary plate 128. From the annular groove 125 the high pressure fluid flows through an axial bore 129 extending through the plate 128, the stator 43 and the commutator plate 68, and into a recess 130 formed in the commutator valve 41a in surrounding relation to the land 127. From recess 130 the high pressure fluid flows through the passages 61a which are then in open communication therewith and into the expanding fluid pockets 48a formed between the stator 43a and the rotor 44a.

The pressure from the contracting pockets 48a is conducted through the passages 61a which are in open communication therewith to a recess 131 formed in the commutator valve 41a in surrounded relation to the land 127. This lower pressure fluid then flows axially through the recess 131 into and through a central bore 132 formed in the commutator plate 61a, through the splined aperture 99a of the rotor 44a and then into a hollow axial passage 133 formed in the operating shaft extension 101a.

In the passage 133 the fluid flows through a radial passage 134 formed in the shaft extension 101a and into a circumferentially continuous groove 136 in communication therewith. From groove 136 the fluid flows through an axial passage 137 and into a circumferential groove 138 formed in the valve 40a.

From the groove 138 pressurized fluid is conducted into groove C, from which it is directed through internal passage 70a to servomotor port 31a and thence through conduit 39a to one end 22a of the hydraulic cylinder 19a.

The fluid being discharged from the opposite end 21a of the cylinder 19a flows through conduit 38a to servomotor port 29a, from which it flows through internal passage 69a to the groove C. From groove C the low pressure fluid flows through groove 73a, through a pressure dam groove X and through another groove 74a to the groove R, from which it flows through internal passage 71a to the return port 30a and thence through conduit 37a to the suction side 36a and the main pump 16a.

The valve 40a is mechanically biased to the neutral position thereof shown in FIG. 8 by means of a pair of coiled springs 139 and 140. These springs reside in a pair of axially extending annular chambers 141 and 142 formed between the shaft extension 101a and the valve 40a. One end 143 of the spring 139 bottoms on a rib 144 formed integrally with the shaft extension 101a and an opposite end 146 is bottomed on a washer 147.

Similarly, one end 148 of the spring 140 is bottomed on the rib 144 whereas an opposite end 149 is bottomed on a radial abutment wall 150 formed on the axially slidable directional control valve 40a.

Thus, as the valve 40a is shifted axially leftwardly as viewed in FIG. 8, the spring 140 is compressed by virtue of the movement of the abutment wall 150 toward the rib 144. Thus, the spring 140 tends to urge the valve 140a rightwardly back to its neutral position.

On the other hand, as the valve 40a is shifted axially rightwardly, the washer 147, which is seated in an annular groove 151 formed in the valve 140a and movable axially with the valve 40a, moves toward the rib 144 and compresses the spring 139. This compression of spring 139 tends to bias the valve 140a leftwardly back to the neutral position thereof.

When the operating shaft 26a is rotated in a counterclockwise fashion, the flow path of the fluid through the controller 18 is reversed from that described above which obtains when the shaft 26a is rotated in a clockwise direction and the valve 40a, instead of shifting axially leftwardly, is shifted rightwardly to another operating position.

The springs 139 and 140 impose a resistance to axial movement of the valve 40a and a resistance to rotational movement of the shaft 26a which bears no relation in magnitude to the resistance to turning to which the steered wheels are subjected.

In accordance with the principles of the present invention and in order to impose a hydraulic reactive force on the operating shaft 26a which varies in accordance with variations in the reaction force to which the steered wheels are subjected, the valve 40a has formed therein a pair of radial passages 152 and 153 which communicate the chambers 141 and 142 with the grooves C and C'. Furthermore, the axial passage 137 formed in the valve 40a also openly communicates with chamber 83a in which the radial end wall 84a of the valve 40a is housed.

In both of the two operating positions of the valve 40a the radial end walls 86a and 84a are subjected to the same fluid pressure. However, when the valve 40a is shifted leftwardly, the chamber 141 (in which the spring 139 is disposed) is subjected to the lower pressure of the groove C, whereas chamber 142 (in which the spring 140 is disposed) is subjected to the higher pressure of the groove C'. Since the chamber 142 is under a higher pressure than chamber 141 the valve 40a is subjected to a hydraulic force, acting upon the motive surface provided by the abutment wall 150, tending to urge the valve 40a rightwardly toward the neutral position thereof.

On the other hand, when the valve 40a is shifted axially rightwardly, the chamber 141 is subjected to the higher pressure of groove C, whereas chamber 142 is subjected to the lower pressure of groove C'. In this latter situation that portion of the radial wall of the washer 151 which openly communicates the chamber 141 serves as a motive surface to hydraulically bias the valve 40a leftwardly toward the neutral position thereof.

It will be appreciated that the hydraulic reaction centering force to which the valve 40a is subjected varies in accordance with the differential in pressure between the two chambers 141 and 142. On the other hand, the difference in fluid pressure between chambers 141 and 142 depends upon the difference in fluid pressure between the opposite ends 21a and 22 of the cylinder 19a. The latter pressure differential, of course, varies in accordance with variations in the resistance to turning to which the steered wheels are subjected. Thus, in the embodiment of FIGS. 8–10, as in the embodiment of FIGS. 1–7, the steering torque required to turn the operating shaft 26a varies as a function of the magnitude of the reaction force to which the steered wheels are subjected.

FIGS. 11 and 12 are illustrative of another embodiment of a one-piece hydrostatic servomotor controller constructed in accordance with the principles of the present invention and having means for providing a hydraulic reaction force to the operating shaft to improve the feel of the road. In addition, however, this latter embodiment provides means for limiting the hydraulic reaction force to a predetermined level. Consequently, the resistance-to-turning forces acting on the steered wheels are transmitted proportionally to the operating shaft only until such forces reach a predetermined level.

The embodiment of the invention shown in FIGS. 11 and 12 includes many parts which are identical or similar in construction or function or both to those appearing in the earlier embodiments and will be identified by means of similar reference characters, where useful to the understanding of the invention, with only the suffix b added.

Generally, the operating shaft 26b, the shaft extension 101b, the spring 104b and the directional control valve 40b are similar to like parts of the embodiment shown in FIG. 1, whereas the wobble shaft 96b, the disc-shaped member 128b, the commutator plate 60b and the commutator valve 41b are the same as the correspondingly designated parts in the second embodiment shown in FIG. 8.

Thus, when the operating shaft 26b is rotated in a clockwise direction, the directional control valve 40b is shifted axially leftwardly. This movement of the valve 40b causes communication of the high pressure groove P with the adjacent groove M, thereby conducting high pressure fluid to the annular groove 125b formed in the member 128b and then through the bore 129 to the outer region of the commutator valve 41b and thence to the expanding fluid pockets 48b formed between the teeth of the stator 43b and the rotor 44b. The fluid from the contracting pockets is directed to the inner region of the commutator valve 41b from which it flows axially into the hollow interior 78b of the directional control valve 40b.

A pair of radial passages 154 and 156 extend through the wall of the directional control valve 40b and communicate the interior valve chamber 78b with the groove C', from which the high pressure fluid flows through side 22b of the hydraulic cylinder 19b.

From the opposite end 21b of the cylinder 19b the fluid is directed to groove C, from which it flows through grooves 72b, X and 73b into the groove R from which it flows back to the suction side 36b of the pump 16b.

As the operating shaft 26b is rotated in a counterclockwise direction the directional control valve 40b shifts axially rightwardly and the direction of fluid flow through the controller 18b to the hydraulic cylinder 19b is reversed. Regardless of which of the two operating positions of valve 40b obtains, however, the opposite radial end walls 84b and 86b of the valve 40b are subjected to the same fluid pressure and therefore offer no hydraulic reaction force to the valve 40b. Instead the reaction force is provided by an arrangement including an internal axial bore 157 which communicates with radial passages 158, 159 and 160, communicating respectively with grooves R, P' and R', and a sloping passage 161 which communicates with a chamber 162.

Disposed within the bore 157 is an axial shiftable valve 163 circumferentially grooved at 164 and having an axial passage 166 extending from a radial bore 167 to an end wall 168. One end 169 of a coil spring 170 is bottomed on an opposite end 171 of the valve 163 and an opposite end 172 is bottomed on an end wall 173 of the bore 157.

The spring 170 biases the valve member 163 in the direction of an abutment pin 174 projecting into a righthand portion 176 of the bore 157. When the valve member 163 is in abutting relation with pin 174 as shown in FIG. 11 chamber 162 communicates with the high pressure groove P' through the passage 161, the valve 163 and the passage 159.

In the abutting position of the valve 163 the end wall 168 provides a motive surface subjected to the pressure of the fluid in the righthand portion 176 of the bore 157, whereas the opposite end wall 171 is subjected to the pressure of the fluid in a lefthand portion 177 of the bore 157, which pressure is equal to the low pressure which obtains in the return groove R. It will be appreciated that an increase in the high pressure fluid in groove P' beyond the limits of the spring 170 will have the effect of unseating the valve member 163 from the abutment pin 174 and shifting it axially leftwardly, thereby blocking communication between the circumferential groove 164 of the valve 163 and the passage 159 and opening communication between the passage 160 and the righthand portion 176 of the bore 157.

Consequently, the chamber 162 is subjected to high pressure fluid until such pressure attains a predetermined level, and upon an increase therebeyond, is subjected to low pressure fluid.

The chamber 162 is annularly shaped and is formed by chamber walls comprising an undercut portion 71b' of the commutator valve wall 71b and an undercut portion 62b' of the bore wall 62b. One end wall of the chamber 162 is formed in part by a radial wall 178 of the directional control valve 40b and in part by a radial wall 179 of the controller housing 24b. An opposite end wall of the chamber 162 is formed by a seal member 180 which is bottomed on a washer 181. The washer 181 is freely shiftable axially within the chamber 162.

A snap ring 182 is fitted in a circumferential recess 183 formed in the wall 71b and the directional control valve 40b. Another washer 184 and a seal member 186 are carried between and are axially shiftable with respect to the body walls 71b of the valve 40b and another undercut portion 62b" of the controller housing 24b. Between the snap ring 182 and the washer 184 is formed a chamber 187 which, as shown in FIG. 11, communicates with the low pressure groove R and R' via a passage 188.

During operation of the controller 18b, when the operating shaft 26b is turned in a clockwise direction and the directional control valve 40b is shifted axially leftwardly, the snap ring 182 urges the washer 181 away from a radial abutment wall 189. When this occurs the high pressure fluid in the chamber 162 tends to bias the valve 40b rightwardly since the force acting in a rightward direction on the seal member 180 and the washer 181 is approximately twice as great as the force acting in an opposite direction on the radial wall 178 of the valve 40b. This rightward reaction force will increase with increases in the pressure of the fluid in the groove P', and in the high pressure side of the hydraulic cylinder 19b. As noted above, however, when the pressure level is exceeded by the limits of the spring 170, the valve member 163 is urged leftwardly to reduce the pressure in the chamber 162 to the low pressure of the return fluid.

When the operating shaft 26b is turned in a counterclockwise direction, thereby shifting the commutator valve 40b axially rightwardly as viewed in FIGS. 11 and 12, the snap ring 182 moves rightwardly, thereby permitting the washer 181 to bottom on the stationary radial abutment wall 189. Thus the seal member 180 and the washer 181 impose no rightward force on the valve 40b, but the pressure acting on the radial wall 178 provides a leftward reaction force to the valve 40b tending to return that valve to its neutral or center position.

In both operating positions of the commutator valve 40b chamber 187 is subjected to pressure of the return fluid and, of course, the areas of the various motive surfaces involved may be selected to provide the desired amount of hydraulic reaction force on the commutator valve 40b and therefore on the operating shaft or steering column 26b.

In no event, however, can the hydraulic reaction force exceed a limit determined by the limits of the spring 170 since the reaction force is relieved by movement of the valve member 163 after that limit has been exceeded.

Although minor modifications might be suggested by those skilled in the art, it should be understood that I wish to embody within the scope of the patent warranted hereon all such modifications as come within the scope of my contribution to the art.

What I claim is:

1. A servomotor controller for use in vehicular power steering and the like systems including a main power fluid pump and a double-acting hydraulic servomotor comprising
    housing means having a high pressure port, a return port and a pair of servomotor ports,
    movable pump-meter fluid displacement means in said housing means,
    means forming a valve chamber in said housing means in communication with said ports and with said fluid displacement means,
    valve means in said valve chamber interconnected to said fluid displacement means for concurrent movement therewith,
    means for moving said valve means relative to said valve chamber for controlling the flow of fluid between said ports and through said fluid displacement means,
        said valve means being movable in opposite directions from a neutral position, at which the fluid pressure at the servomotor ports is balanced, alternatively to either one of a pair of operating positions, at either of which the fluid pressure at the servomotor ports is unbalanced, and
    means forming fluid pressure motive surfaces on said valve means communicating with said servomotor ports for hydraulically biasing said valve means toward the neutral position thereof with a force corresponding in magnitude to the magnitude of the fluid pressure differential between said servomotor ports.

2. The invention as defined in claim 1 wherein said valve means comprises a cylindrically shaped axially shiftable valve and rotatable operating shaft means mounted on said housing means and mechanically connected to said cylindrical valve for axially shifting the latter upon rotation of the former.

3. The invention as defined in claim 1,
    said valve means comprising an axially shiftable and rotatable spool valve and said fluid displacement means comprising a rotatable member connected for joint rotation to said spool valve.

4. The invention as defined in claim 1 wherein said valve means comprises a spool valve shiftable axially from said neutral position to said operating positions and wherein said motive surfaces extend radially on said spool valve.

5. The invention as defined in claim 1 wherein said motive surfaces include at least two wall members facing respectively in said opposite directions and including
    means hydraulically separating said wall members within said valve chamber and means communicating said wall members respectively with different ones of said pair of servomotor ports.

6. The invention as defined in claim 1 wherein said motive surface forming means comprises a pair of wall members facing respectively in said opposite directions and hydraulically separated from one another in said valve chamber and including
    means communicating one of said wall members with said pressure port and the other of said wall members with said return port, and pressure responsive means in said last named means for blocking communication between said pressure port and said one motive surface when the pressure differential therebetween exceeds a predetermined level.

7. A one-piece hydrostatic servomotor controller comprising a housing having a high pressure port, a low pressure port and a pair of servomotor ports, fluid displacement means in said housing comprising a pair of gear members including a toothed stator and a toothed rotor engageable therewith and rotatably and orbitally movable relative thereto, means forming a cylindrical wall in said housing defining a valve chamber communicating with said ports and with said gear members, a rotatable operating shaft mounted on said housing, an axial valve in said valve chamber for controlling the direction of the flow of fluid between said ports and through said gear members, means connecting said valve to one of said gear members for joint rotation therewith and to said operating shaft for limited relative rotation therewith and for axial movement relative thereto in response to relative rotation therewith, said valve being shiftable axially in opposite directions from a neutral position to a pair of axially spaced operating positions, and a pair of oppositely facing motive surfaces formed on said valve and communicating with a corresponding pair of said ports for hydraulically urging said valve toward the neutral position thereof with a force corresponding in magnitude to the magnitude of the difference in fluid pressure between said corresponding pair of ports.

8. The invention as defined in claim 7 and including mechanical means operatively interposed between said valve and said operating shaft for biasing said spool valve toward the neutral position thereof.

9. The invention as defined in claim 7 wherein said fluid displacement means comprises a fluid commutator valve operatively interconnected to said gear members for movement in timed relation therewith and for directing fluid into and out of the expanding and contracting spaces between the teeth of said rotor and stator.

10. The invention as defined in claim 9, said commutator valve being connected to said gear members for rotational movement at the rotational speed of said gear members.

11. The invention as defined in claim 9, said commutator valve being connected to said gear members for rotational movement at the orbital speed of said gear members.

12. A servomotor controller for use with a main power fluid pump and a hydraulic servomotor comprising a housing having a high pressure port, a return port and a pair of servomotor ports, fluid pump-meter displacement means in said housing including a rotatable gear member, valve means in said housing including an axially shiftable and rotatable spool valve connected to said gear member for joint rotation and communicating with said ports and said fluid displacement means for controlling the flow of fluid therebetween, a rotatable operating shaft mounted on said housing and connected to said spool valve for limited relative rotation and for relative axial shifting in response to relative rotation from a neutral position to an operating position, means forming a pair of fluid pressure-responsive motive surfaces on said spool valve communicating respectively with said high pressure port and said return port for hydraulically biasing the spool valve toward said neutral position thereof with an axial force proportional in magnitude to the magnitude of the difference in fluid pressure between said high pressure and return ports.

13. The invention as defined in claim 12, said motive surfaces being formed at the axially opposite ends of said spool valve.

14. The invention as defined in claim 12, said motive surfaces being located at the peripheral wall of said spool valve between the axially opposite ends thereof and including means communicating the opposite ends of the valve with one another for balancing the hydraulic pressure acting thereon.

15. The invention as defined in claim 12 and including means for blocking communication of said high pressure port with its corresponding motive surface when the difference in fluid pressure between said high pressure port and said return port exceeds a predetermined level.

16. A servomotor controller comprising a housing having a high pressure port, a return port and first and second servomotor ports, means forming a generally cylindrical chamber wall in said housing, a generally cylindrical spool valve in said chamber wall shiftable axially from a neutral position to a first operating position at which said high pressure port and said first servomotor port are in communication and said return port and said second servomotor port are in communication and to a second operating position at which said high pressure port and said second servomotor port are in commupnication and said return port and said first servomotor port are in communication, fluid pressure motive surfaces formed on said chamber wall means and on the peripheral wall of said spool valve forming a pair of axially spaced pressure chambers a first of which communicates with said high pressure port and a second of which communicates with said return port, axially slidable fluid seal means on the peripheral wall of said spool valves separating said pressure chambers, oppositely facing stationary radial abutment walls on said chamber wall and on the peripheral wall of said spool valve for moving said seal means with said spool valve when said spool valve moves to said first operating position and for maintaining said seal means stationarily when said spool valve moves to said second operating position.

17. The invention as defined in claim 16 and including means blocking communication between said high pressure port and its corresponding one of said pressure chambers when the fluid pressure at said high pressure port exceeds a predetermined level.

References Cited

UNITED STATES PATENTS

| | | | |
|---|---|---|---|
| 2,968,316 | 1/1961 | Schultz | 60—52 S UX |
| 3,159,084 | 12/1964 | Zeifiler et al. | 60—52 S X |
| 3,385,057 | 5/1968 | Pruvot et al. | 60—52 S |
| 3,452,543 | 7/1969 | Goff et al. | 60—52 S |
| 3,528,521 | 9/1970 | Ellis | 91—467 X |

EDGAR W. GEOGHEGAN, Primary Examiner

U.S. Cl. X.R.

91—467; 180—79.2